United States Patent
Murata

(10) Patent No.: US 9,682,506 B2
(45) Date of Patent: Jun. 20, 2017

(54) CONTROL METHOD AND CONTROL DEVICE FOR INJECTION MOLDING MACHINE

(71) Applicant: NISSEI PLASTIC INDUSTRIAL CO., LTD., Hanishina-gun, Nagano-ken (JP)

(72) Inventor: Hirofumi Murata, Hanishina-gun (JP)

(73) Assignee: NISSEI PLASTIC INDUSTRIAL CO., LTD., Nagano-Ken (JP)

( * ) Notice: Subject to any disclaimer, the term of this patent is extended or adjusted under 35 U.S.C. 154(b) by 142 days.

(21) Appl. No.: 14/597,455

(22) Filed: Jan. 15, 2015

(65) Prior Publication Data

US 2015/0202815 A1    Jul. 23, 2015

(30) Foreign Application Priority Data

Jan. 17, 2014    (JP) .................................. 2014-006437

(51) Int. Cl.
  *B29C 45/80*    (2006.01)
  *B29C 45/76*    (2006.01)

(52) U.S. Cl.
  CPC .... *B29C 45/76* (2013.01); *B29C 2945/76096* (2013.01); *B29C 2945/76267* (2013.01); *B29C 2945/76381* (2013.01); *B29C 2945/76384* (2013.01); *B29C 2945/76391* (2013.01); *B29C 2945/76414* (2013.01); *B29C 2945/76461* (2013.01); *B29C 2945/76505* (2013.01); *B29C 2945/76869* (2013.01); *B29C 2945/76936* (2013.01)

(58) Field of Classification Search
  CPC B29C 2945/76096; B29C 2945/76086; B29C 2945/76869
  See application file for complete search history.

(56) References Cited

U.S. PATENT DOCUMENTS 4,131,596 A * 12/1978 Allen ...................... B29C 45/80
                                                      264/40.5
5,015,426 A *  5/1991 Maus ................... B29C 45/561
                                                      264/2.2

(Continued)

FOREIGN PATENT DOCUMENTS

JP          2013-22842 A      2/2013

*Primary Examiner* — Jill Heitbrink
(74) *Attorney, Agent, or Firm* — Birch, Stewart, Kolasch & Birch, LLP

(57) ABSTRACT

A molding injection pressure Pi with which a parting opening Lm is formed between a movable mold 2*m* and a fixed mold 2*c* during injection-filling and which allows formation of a good molded article is obtained and set in advance. A molding clamping force Pc that allows formation of a good molded article is obtained and set in advance. During production, a mold clamping device Mc is clamped with the molding clamping force Pc, and an injection device Mi to apply the molding injection pressure Pi as a limit pressure Ps is driven to injection-fill a mold 2 with resin R. A parting opening detector 3 that detects the parting opening Lm is provided. During production, reset control is executed to reset the parting opening detector 3 to zero if reset timing tr set in advance has come at least on condition that given preparation for injection is completed after clamping. The reset timing is set in a range covering a given period Zs before injection start time and the given period Zs after the injection start time.

8 Claims, 10 Drawing Sheets

(56) References Cited

U.S. PATENT DOCUMENTS

| | | | |
|---|---|---|---|
| 5,540,577 A * | 7/1996 | Ishikawa | B29C 45/762 264/40.5 |
| 6,089,850 A * | 7/2000 | Dreier | B29C 45/17 264/40.5 |
| 2003/0230821 A1* | 12/2003 | Okado | B29C 43/58 264/40.5 |
| 2012/0146260 A1* | 6/2012 | Murata | B29C 45/572 264/328.1 |
| 2013/0022698 A1 | 1/2013 | Kasuga et al. | |

* cited by examiner

CONTROL METHOD AND CONTROL DEVICE FOR INJECTION MOLDING MACHINE

This application claims the benefit under 35 U.S.C. §119 (a) to Patent Application No. JP 2004-006437 filed on Jan. 17, 2014 in Japan which is hereby expressly incorporated by reference into the present application.

TECHNICAL FIELD

This invention relates to a control method and a control device for an injection molding machine to be adopted for molding according to a specific molding system.

BACKGROUND ART

A waveform monitor apparatus (control device) for an injection molding machine described in Patent Literature 1 suggested by the applicant of this applicant has already been known as a conventional control device provided to an injection molding machine. This injection molding machine performs molding according to a specific molding system where an injection pressure (molding injection pressure) and a clamping force (molding clamping force) are obtained and set with which a parting opening to become a given clearance is formed between a movable mold and a fixed mold of a mold during injection-filling and which allow formation of a good molded article, a mold clamping device is clamped with the molding clamping force, and an injection device to apply the molding injection pressure as a limit pressure is driven, thereby injection-filling the mold with resin.

This waveform monitor apparatus (control device) allows change in the parting opening of the mold as an operation waveform relating to the mold clamping device to be monitored easily and effectively by visual recognition. Even in the injection molding machine that performs molding according to the specific molding system, this waveform monitor apparatus (control device) is intended to achieve sufficient monitoring during production, increase a molding quality, a yield and the like, and contribute to general versatility and expandability. More specifically, a waveform monitor apparatus for an injection molding machine for monitoring an operation waveform at least during molding is structured by being provided to the injection molding machine that performs molding according to a specific molding system where an injection pressure (molding injection pressure) and a clamping force (molding clamping force) are obtained and set with which a parting opening to become a given clearance is formed between a movable mold and a fixed mold of a mold during injection-filling and which allow formation of a good molded article, a mold clamping device is clamped with the molding clamping force, and an injection device to apply the molding injection pressure as a limit pressure is driven, thereby injection-filling the mold with resin. The waveform monitor apparatus includes a parting opening detecting means that detects data about change in the parting opening with time during molding, and an operation waveform display means that displays the change data detected by the parting opening detecting means at least in a period from when injection-filling of the mold with the resin is started to when cooling time of the mold is finished in a waveform display part on a screen on a display provided to a molding machine controller.

SUMMARY OF INVENTION

Technical Problem

However, the conventional control device (waveform monitor apparatus) provided to the aforementioned injection molding machine leaves the following problem unsolved.

If an injection molding machine is to perform molding according to the specific molding system, like a physical quantity such as a clamping force or an injection speed, a parting opening to be detected by a position detector (parting opening detecting means) becomes an important parameter in a molding step.

This position detector generally performs zero-resetting (calibration) in a closed position where the mold is clamped (immediately after the mold is clamped) to reset this closed position to zero. Meanwhile, there is some injection standby time from when the clamping is finished to when injection is started. The set clamping force is maintained during the injection standby, so that the parting opening is not influenced under normal circumstances. Thus, no problem will occur in a general-purpose system which is not a specific system, specifically, in a general-purpose system inherently free from the idea of a parting opening. However, this standby time becomes a non-negligible issue in the particular molding system where a parting opening becomes an important parameter. More specifically, a disturbance factor resulting from fluctuation of a mold temperature between shots, action taken in a different concurrent step or the like might be rather influential. Thus, room for further improvement has been left in terms of collecting data about an accurate parting opening stably.

This invention is intended to provide a control method and a control device for an injection molding machine that solve the aforementioned problem in the background art.

Solution to Problem

To solve the aforementioned problem, the control method for an injection molding machine according to this invention is adopted for molding according to a specific molding system where a molding injection pressure and a molding clamping force are obtained and set in advance, and during production, a mold clamping device is clamped with the molding clamping force and an injection device to apply the molding injection pressure as a limit pressure is driven to injection-fill a mold with resin. The molding injection pressure is an injection pressure with which a parting opening to become a given clearance is formed between a movable mold and a fixed mold of the mold during injection-filling and which allows formation of a good molded article. The molding clamping force is a clamping force that allows formation of a good molded article. A parting opening detector is provided that detects the parting opening. Reset control is executed to reset the parting opening detector to zero during production if reset timing set in advance has come at least on condition that given preparation for injection is completed after clamping by the mold clamping device is finished. The reset timing is set in a range covering a given period before injection start time and the given period after the injection start time.

Advantageous Effects of Invention

The control method and the control device for an injection molding machine according to this invention achieve the following noticeable effects.

(1) The set molding clamping force is maintained during injection standby from when clamping is finished to when injection is started. Further, even if there is a disturbance factor resulting from fluctuation of a mold temperature between every shot, action taken in a different concurrent step or the like, unnecessary influence on the magnitude of the parting opening can be eliminated. Thus, accurate data about the parting opening can be collected stably. Thus, all the parting openings with the same zero-point can be monitored accurately and a molded article can be determined to be good or bad correctly, thereby contributing to increase in a yield.

(2) According to a preferred aspect, a position detector to detect the positions of the movable mold and the fixed mold relative to each other is provided as the parting opening detector to the mold. Thus, the dimension of the parting opening can be detected directly. This makes it possible to acquire an accurate parting opening with a minimum possible error factor except the position detector and data about change in the parting opening.

(3) According to a preferred aspect, completion of the preparation for injection includes at least one or both of the following conditions: nozzle-touch action should be finished; and a mold temperature should reach a stable condition. This can eliminate the two factors to become the most serious disturbance factors to influence the dimension of the parting opening. Thus, effects can be ensured effectively relating to the aforementioned accurate monitoring of all the parting openings and a correct determination as to whether a molded article is good or bad.

(4) According to a preferred aspect, a molding machine controller is provided with an operation waveform display means that displays change data detected by the parting opening detector in a period from start of injection to end of cooling of the mold in a waveform display part on a screen on a display provided to the molding machine controller. This allows change in the parting opening of the mold as an operation waveform relating to the mold clamping device to be monitored easily and effectively by visual recognition. Additionally, waveforms of all parting openings with the same zero-point can be displayed (and superimposed) accurately.

(5) According to a preferred aspect, the reset timing is set as a condition for molding relating to one molding cycle. The reset control is executed for each shot. Thus, errors due to various disturbance factors can be eliminated most effectively, so that the dimension of the parting opening can always be collected accurately and stably for each shot.

DESCRIPTION OF EMBODIMENTS

A preferred embodiment of this invention is described below in detail based on the drawings. The accompanying drawings are not to limit this invention but to facilitate understanding of this invention. In order not to make this invention unclear, a well-known part is not described in detail.

Figure 3:
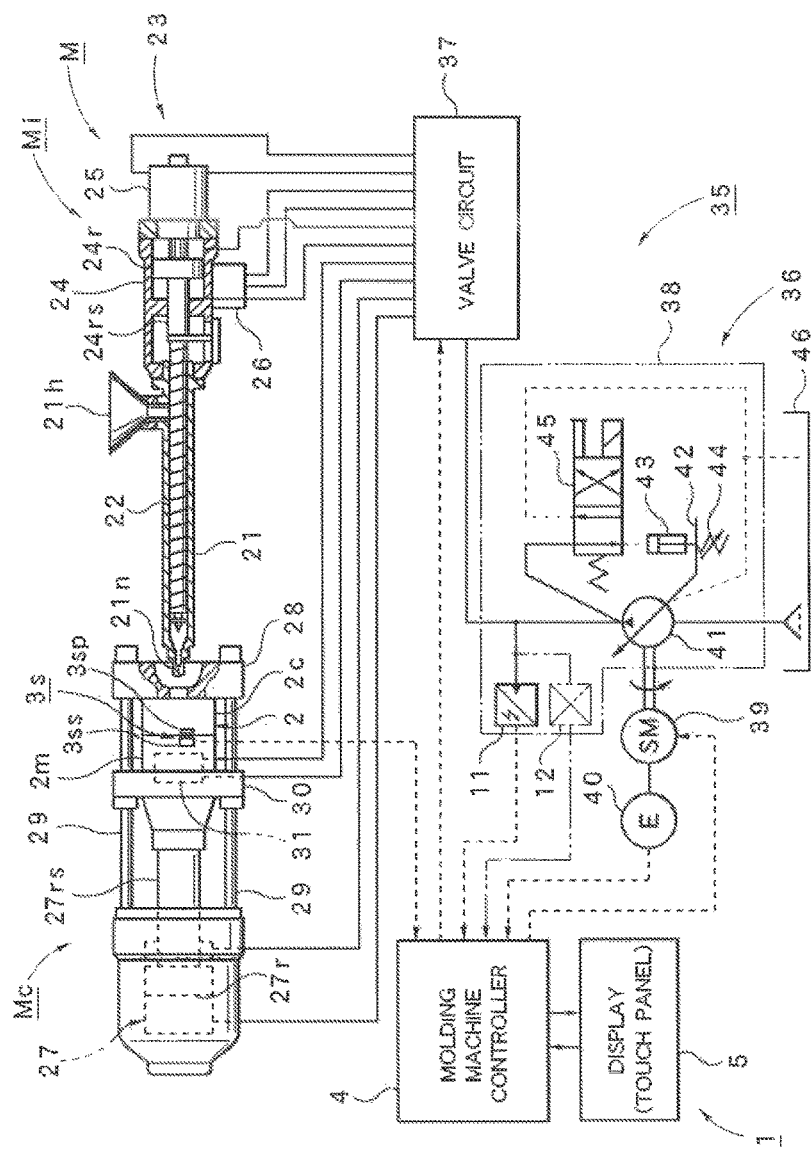
FIG. 3 shows the structure of an injection molding machine that can implement this control method.

To facilitate understanding of a control device 1 of this embodiment, the entire structure of an injection molding machine M including the control device 1 is described first by referring to FIG. 3.

Figure 13:
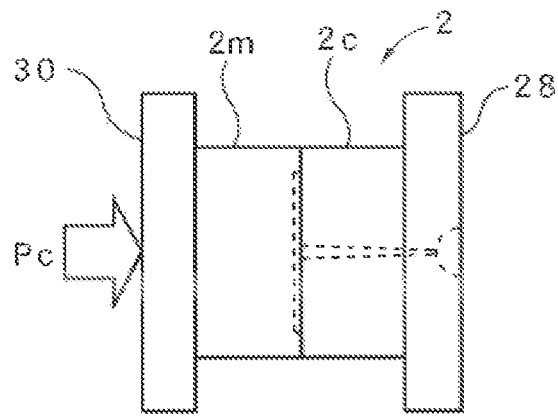
FIG. 13(a) schematically shows a condition of a mold in this injection molding machine.
FIG. 13(b) schematically shows a different condition of the mold in this injection molding machine.
FIG. 13(c) schematically shows a different condition of the mold in this injection molding machine.
Figure 13:
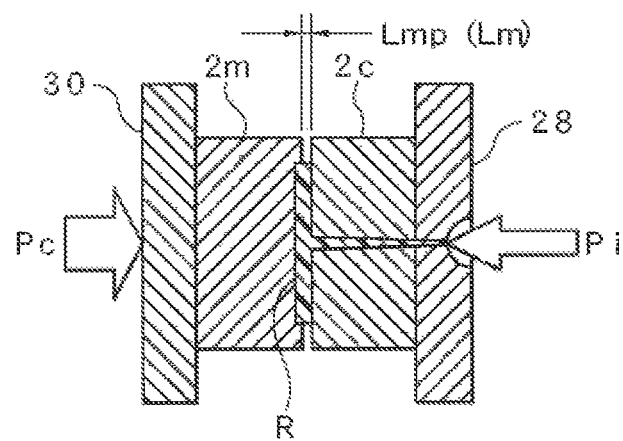
Figure 13:
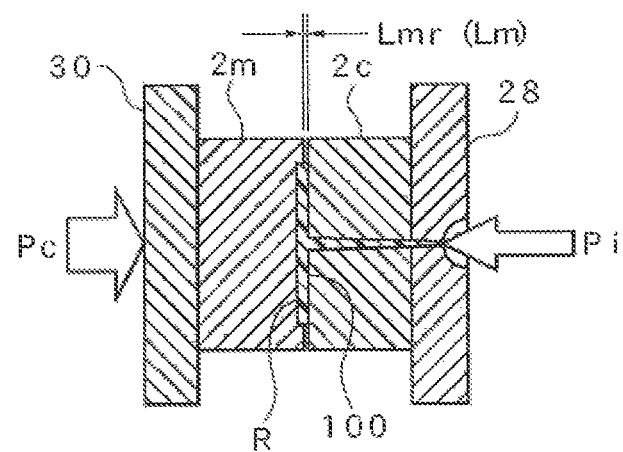

Referring to FIG. 3, M is an injection molding machine including an injection device Mi and a mold clamping device Mc. The injection device Mi includes a heating tube 21 with an injection nozzle 21*n* at a front end and a hopper 21*h* at a rear part. A screw 22 is inserted in the heating tube 21. A screw driver 23 is provided at the rear end of the heating tube 21. The screw driver 23 includes an injection cylinder (hydraulic cylinder) 24 with a built-in single-rod injection ram 24*r*. A ram rod 24*rs* projecting forward from the injection cylinder 24 is coupled to the rear end of the screw 22. A shaft of a metering motor (oil motor) 25 attached to the injection cylinder 24 is splined to the rear end of the injection ram 24*r*. A sign 26 shows an injection device moving cylinder that moves the injection device Mi back and forth to make nozzle-touch with a mold 2 and release the injection device Mi from the nozzle-touch. In this way, the injection device Mi makes the injection nozzle 21*n* touch the mold 2, so that molten (plasticized) resin R (FIG. 13) can injection-fill a cavity of the mold 2.

A direct-pressure hydraulic mold clamping device to displace a movable mold 2*m* with a driving ram 27*r* of a clamping cylinder (hydraulic cylinder) 27 is used as the mold clamping device Mc. By using such a hydraulic mold clamping device as the mold clamping device Mc, a necessary clearance (parting opening) Lm (Lmp, Lmr) can be formed optimally by displacing the movable mold 2*m* under an injection pressure during injection-filling. The mold clamping device Mc has a movable disk 30 fitted to multiple tie bars 29 in a way that allows sliding motion of the movable disk 30 freely. The tie bars 29 are provided to extend between a fixed disk 28 and the clamping cylinder 27 in fixed positions and separated from each other. A tip of a ram rod 27rs projecting forward from the clamping cylinder 27 is fixed to the movable disk 30. A fixed mold 2c is attached to the fixed disk 28 and the movable mold 2m is attached to the movable disk 30. The fixed mold 2c and the movable mold 2m form the mold 2. As a result, the clamping cylinder 27 is allowed to open and close the mold 2 and clamp the mold 2. A sign 31 shows an ejector cylinder that ejects a molded article 100 (FIG. 13) attached to the movable mold 2m when the mold 2 is opened.

A sign 35 shows a hydraulic circuit that includes a variable delivery hydraulic pump 36 to become a hydraulic driving source and a valve circuit 37. The hydraulic pump 36 includes a pump part 38 and a servomotor 39 that rotates the pump part 38. A sign 40 shows a rotary encoder that detects the number of rotations of the servomotor 39. The pump part 38 includes a built-in pump body 41 formed of a swash plate piston pump. Specifically, the pump part 38 includes a swash plate 42. Increasing the inclination angle (swash plate angle) of the swash plate 42 increases the stroke of a pump piston in the pump body 41 to increase a delivery flow rate. Reducing the swash plate angle reduces the stroke of this pump piston to reduce a delivery flow rate. Thus, setting the swash plate angle to a given angle allows setting of a fixed delivery flow rate indicating a delivery flow rate (maximum capacity) fixed to a given magnitude. The swash plate 42 is provided with a control cylinder 43 and a return spring 44. The control cylinder 43 is connected to a delivery port of the pump part 38 (pump body 41) through a selector valve (solenoid valve) 45. As a result, by controlling the control cylinder 43, the angle of the swash plate 42 (swash plate angle) can be changed.

An intake port of the pump part 38 is connected to an oil tank 46. The delivery port of the pump part 38 is connected to the primary side of the valve circuit 37. The secondary side of the valve circuit 37 is connected to the injection cylinder 24, the metering motor 25, the clamping cylinder 27, the ejector cylinder 31, and the injection device moving cylinder 26 of the injection molding machine M. Accordingly, the valve circuit 37 includes a selector valve (solenoid valve) connected to each of the injection cylinder 24, the metering motor 25, the clamping cylinder 27, the ejector cylinder 31, and the injection device moving cylinder 26. Each selector valve is formed of one or two or more valve parts and a necessary hydraulic accessory, for example. Each selector valve has a selecting function relating to at least supply of operating oil, stop supply of the operating oil, and discharge of the operating oil for the injection cylinder 24, the metering motor 25, the clamping cylinder 27, the ejector cylinder 31, and the injection device moving cylinder 26.

Thus, by variably controlling the number of rotations of the servomotor 39, the delivery flow rate and the delivery pressure of the variable delivery hydraulic pump 36 can be varied. This control allows control of driving of the injection cylinder 24, the metering motor 25, the clamping cylinder 27, the ejector cylinder 31, and the injection device moving cylinder 26, while allowing control of each operation step in a molding cycle. By using the variable delivery hydraulic pump 36 with the fixed delivery flow rate that can be set by changing the swash plate angle in this way, a pump capacity can be set to the fixed delivery flow rate (maximum capacity) of a given magnitude and a delivery flow rate and a delivery pressure can be varied based on the fixed delivery flow rate. This facilitates control by a control system smoothly.

The structure of the control device 1 of this embodiment is described next specifically by referring to FIGS. 3 to 5.

Figure 4:
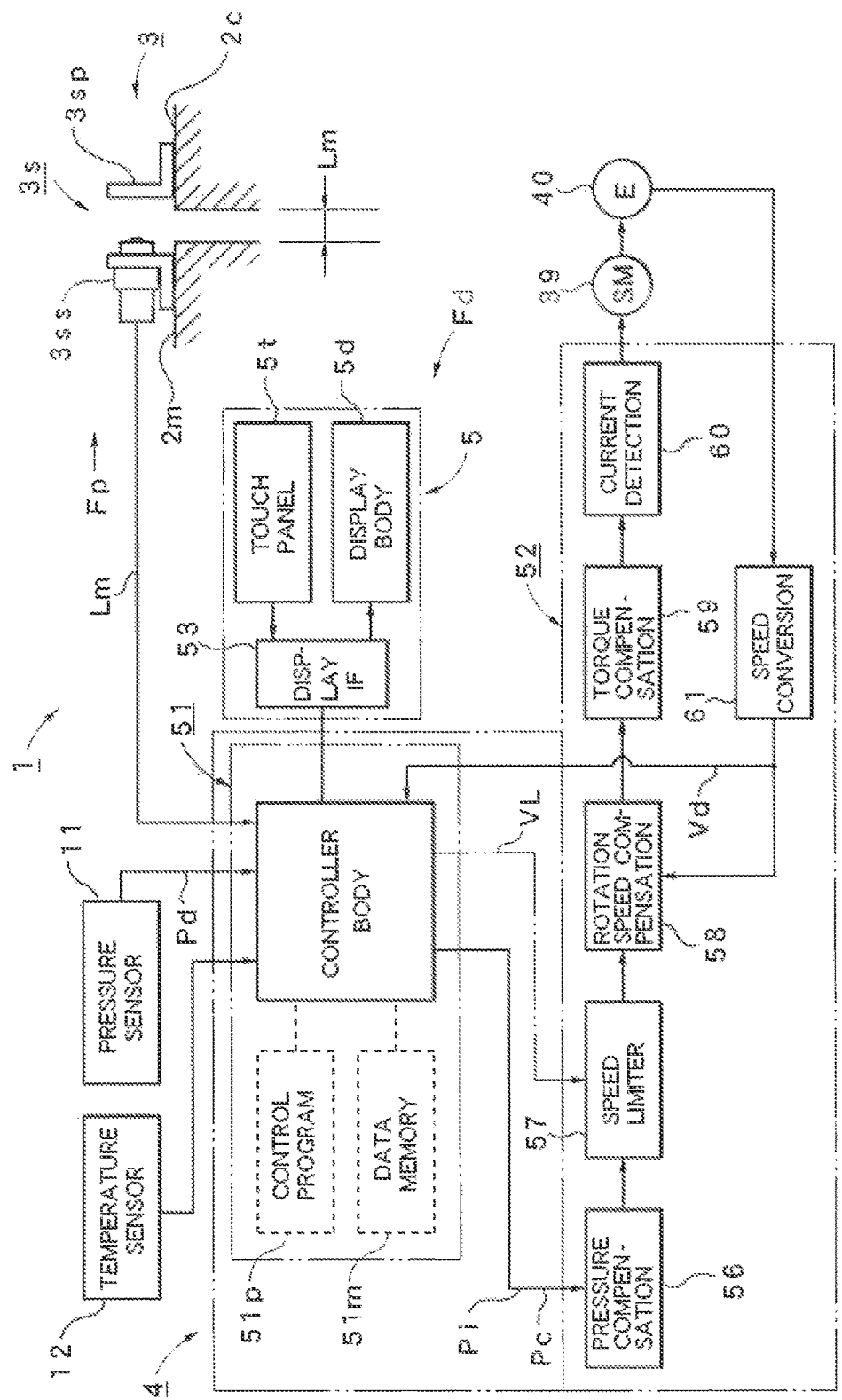
FIG. 4 is a block system diagram of a control device that can implement this control method.

The control device 1 includes a molding machine controller 4 shown in FIG. 4 forming a principal part of the control device 1. The molding machine controller 4 is provided with a display 5. As shown in FIG. 4, the molding machine controller 4 has a built-in servo amplifier 52. The servo amplifier 52 has an output part connected to the servomotor 39. The servo amplifier 52 has an encoder pulse input part connected to the rotary encoder 40. As shown in FIG. 3, the molding machine controller 4 has a control signal output port connected to the valve circuit 37.

A position detector 3s is provided on an outer side surface of the mold 2. The position detector 3s has the function of detecting the positions of the movable mold 2m and the fixed mold 2c relative to each other, specifically the magnitude of a parting opening Lm. As shown in FIG. 4, the position detector 3s can be formed for example of a combination of a reflection plate 3sp attached to the fixed mold 2c (or movable mold 2m), and a reflection range sensor 3ss attached to the movable mold 2m (or fixed mold 2c) to measure a distance by projecting light or a radio wave to the reflection plate 3sp. If the position detector 3s is to be provided on the upper surface of the mold 2, it is desirable that the position detector 3s be arranged near the center of the lateral direction. If the position detector 3s is to be provided on a side surface of the mold 2, it is desirable that the position detector 3s be arranged near the center of the vertical direction. The position detector 3s forms a parting opening detector 3 of the control device 1 of this embodiment that detects data about change in parting openings Lm with time during molding. In this way, the position detector 3s is provided as the parting opening detector 3 to the mold 2. Thus, by using the position detector 3s that detects the positions of the movable mold 2m and the fixed mold 2c relative to each other, the dimension of the parting opening Lm can be detected directly. This advantageously makes it possible to acquire an accurate parting opening Lm with a minimum possible error factor except the position detector 3s and data about change in the parting opening Lm. The primary side of the valve circuit 37 of the hydraulic circuit 35 is provided with a pressure sensor 11 that detects a hydraulic pressure and a temperature sensor 12 that detects an oil temperature. The position detector 3s, the pressure sensor 11, and the temperature sensor 12 are connected to sensor ports of the molding machine controller 4.

The molding machine controller 4 includes a controller body 51 and the servo amplifier 52. The controller body 51 has a computer function with built-in hardware including a CPU and an internal memory. Therefore, the internal memory stores a control program (software) 51p for implementation of various calculations and various controls (sequence control), and a data memory 51m that can store data of various types (database), for example. In particular, the control program 51p contains a control program for implementation of a control method of this embodiment.

To make the injection molding machine M perform molding action according to a specific molding system (specific molding mode), the internal memory stores a control program (sequence control program) for this molding action. The specific molding mode mentioned herein is a molding mode according to which a molding injection pressure Pi and a molding clamping force Pc are obtained and set in advance with which a given clearance, specifically the parting opening Lm is formed between the movable mold 2m and the fixed mold 2c of the mold 2 during injection-filling and which allow formation of a good molded article. During molding (during production), the mold clamping device Mc is clamped with the molding clamping force Pc and the injection device Mi to apply the molding injection pressure Pi as a limit pressure Ps is driven to injection-fill the mold 2 with the resin R. A molded article is ejected if given time Tc for cooling the mold 2 has elapsed after the injection-filling. The control device 1 of this embodiment executes control according to this specific molding mode. This specific molding mode is described in detail later.

The display 5 includes a display body 5d and a touch panel St provided to the display body 5d. The display body 5d and the touch panel 5t are connected to the controller body 51 through a display interface 53. Therefore, this enables various operations for setting, selection and the like by the touch panel St. A screen 5v shown in FIG. 5 is displayed on the display 5 in association with the control device 1 of this embodiment. The screen 5v is an injection and metering screen. Multiple screen selector keys including K1 and K2 for selection of a screen appear at an upper row and a lower row of this injection and metering screen 5v. The screen selector keys including K1 are ranked according to the frequency of use. The upper row has a first group Ga relating to setting of an operating condition of the molding machine. The first group Ga includes a "mold opening and closing screen" selector key K1, an "ejector screen" selector key K2, an "injection and metering screen" selector key K3 with which the injection and metering screen 5v shown in FIG. 5 is displayed, a "temperature screen" selector key K4, a "monitor screen" selector key K5, a "prime condition screen" selector key K6, and a "condition selection screen" selector key K7 that are horizontally aligned in one row. The lower row has a second group Gb with different keys including an "operation switch screen" selector key K8, a "step monitoring screen" selector key K9, a "production information screen" selector key K10, a "waveform screen" selector key K11, a "history screen" selector key K12, and a "support screen" selector key K13 that are horizontally aligned in one row. These keys including K1 appear in the same positions and in the same shapes even after the injection and metering screen 5v is switched to a different screen such as a mold opening and closing screen. A sign Kc shows a selector key with which a screen in a second layer is selected.

The injection and metering screen 5v includes a molding mode selector key Km. Touching the molding mode selector key Km allows switching between the specific molding mode and a general-purpose molding mode. As shown in FIG. 5, the injection and metering screen 5v includes an injection speed setting part 71 for setting relating to an injection speed, an injection pressure setting part 72 for setting relating to an injection pressure, a metering setting part 73 for setting relating to metering, and an auxiliary setting part 74 for different setting and display. These setting parts 71, 72, 73 and 74 are common to the specific molding mode and the general-purpose molding mode.

The injection and metering screen 5v further includes a waveform display part 6 where data about change is displayed which is detected by the position detector 3s at least in a period from injection start time ts when injection into the mold 2 is started to end te of cooling of the mold 2 (end of cooling time). The waveform display part 6 forms operation waveform display means Fd. The waveform display part 6 shows a temporal axis [seconds] on the horizontal axis and the parting opening Lm [mm], the injection pressure Pi [Mpa], and an injection speed Vi [mm/s] on the vertical axis. In particular, the time [seconds] on the horizontal axis has a length with which a plot can be made reliably at least in a period from the injection start time ts when filling of the mold 2 with resin is started to the end te of cooling of the mold 2. To achieve this, three time setting parts 75, 76 and 77 are prepared below the waveform display part 6. The time setting part 75 is a start time setting part that sets a time when display of a waveform is started after start of injection. By setting the start time to "0.000" [seconds], for example, a waveform is displayed at the start of injection ("0.000" [seconds]). The time setting part 76 is a scale time setting part that sets a scale interval on the waveform temporal axis. By setting the scale interval to "1.000," for example, one scale is set to "1.000" [second]. The time setting part 77 is a total display time setting part that sets a waveform display termination time after start of injection. By setting the waveform display termination time to "15.000" [seconds], for example, a waveform is displayed for "15.000" [seconds] after start of injection. The parting opening Lm [mm], the injection pressure Pi [Mpa], and the injection speed Vi [mm/s] to be shown on the vertical axis can be set on a waveform screen to be displayed by touching the waveform screen selector key K11. FIG. 5 shows a condition where parting openings Lm corresponding to four shots, specifically parting openings Lma, Lmb, Lmc, and Lmd are superimposed.

The three time setting parts 75, 76 and 77 achieve a partially enlarged display function by which any partial section on the temporal axis (horizontal axis) in the waveform display part 6 can be designated and displayed in an enlarged manner. Specifically, a partial section is designated by using the start time setting part 75 and the total display time setting part 77. Then, scale time is set by using the scale time setting part 76. As a result, any section in a waveform can be displayed in an enlarged manner. Any partial section in a waveform can be displayed in an enlarged manner by providing this partially enlarged display function. Therefore, for example, displaying a point where the parting opening Lm reaches its maximum and the vicinity of this point in an enlarged manner advantageously makes it possible to check an important part more carefully and to set (change) a condition relating to injection and a condition relating to a clamping force easily.

The waveform display part 6 is used only for the specific molding mode. In the general-purpose molding mode, display differing from that on the waveform display part 6, specifically, conventionally publicly-known general waveform display is given. By allowing switching between the specific molding mode and the general-purpose molding mode and using the waveform display part 6 (operation waveform display means Fd) only in the selected specific molding mode, the specific molding mode can be optimized while the general-purpose molding mode is not sacrificed. This allows selection of a molding system conforming to a molding scene differing in various ways such as the type of a molded article or a molding material. As a result, the versatility of the injection molding machine M can be enhanced and the injection molding machine M can be given a higher added value and an increased quality as a product, while a user can be given a higher level of usability.

Figure 5:
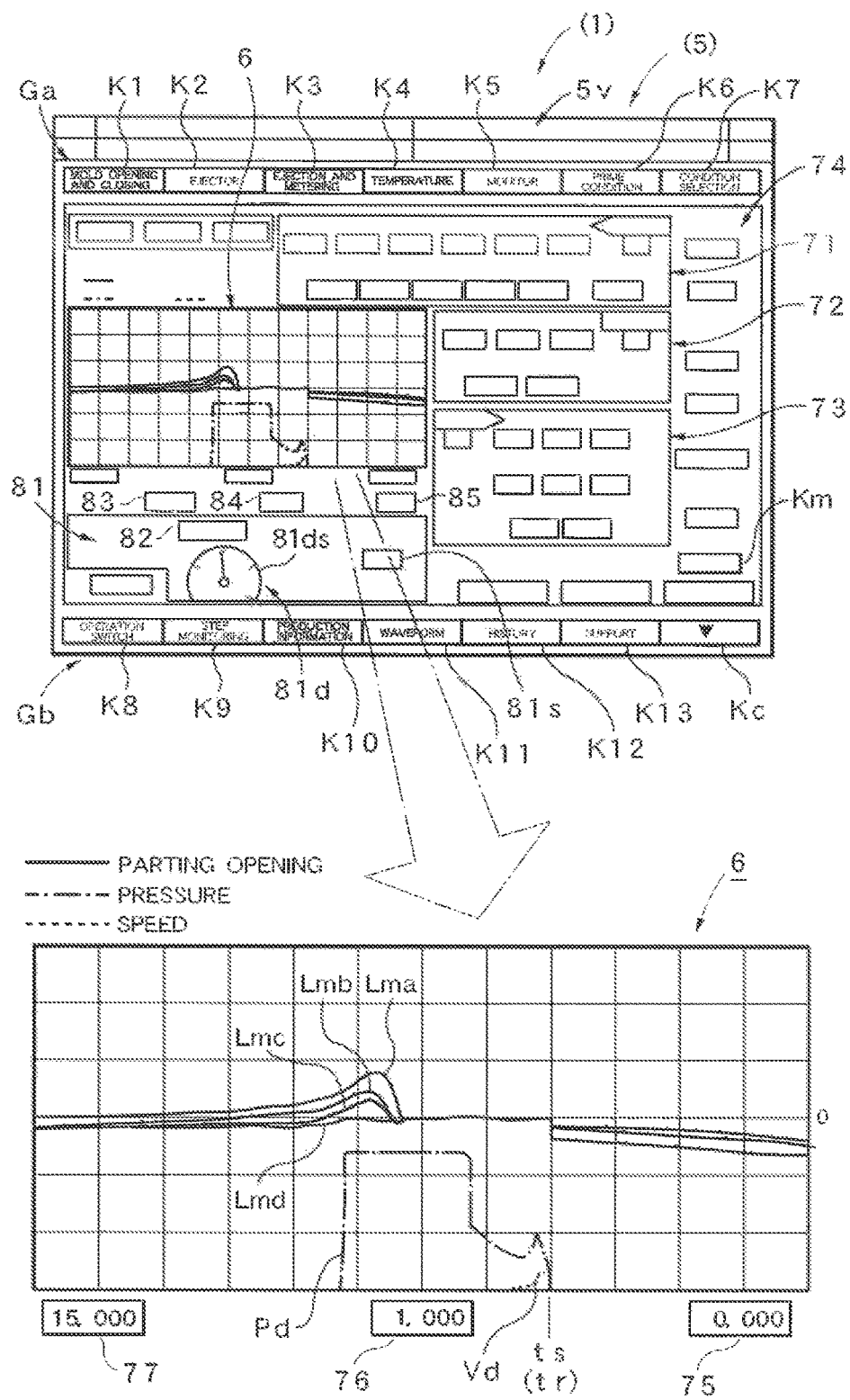
FIG. 5 shows a screen and an extracted waveform display part in an enlarged manner on a display of this control device.

The operation waveform display means Fd has a superimposing function by which data about change in an injection pressure Pd with time during molding is superimposed on data about change in the parting opening Lm in the waveform display part 6, as shown in FIG. 5. Data detected by the pressure sensor 11 can be used as this change data about the injection pressure Pd. By providing this superimposing function, change in the parting opening Lm with time can be understood in comparison with the change in the injection pressure Pd with time. This advantageously makes it possible to monitor the change data about the parting opening Lm more accurately and optimize a molding condition easily by fine adjustment, for example. The operation waveform display means Fd further has a superimposing function by which data about change in an injection speed Vd with time during molding is superimposed on data about change in the parting opening Lm in the waveform display part 6, as shown in FIG. 5. An output result given from a speed converter 61 shown in FIG. 4 can be used as this change data about the injection speed Vd. By providing this superimposing function, change in the parting opening Lm with time can be understood in comparison with the change in the injection speed Vd with time. Therefore, this advantageously makes it possible to monitor the change data about the parting opening Lm accurately and optimize a molding condition easily by fine adjustment, for example.

A specific molding setting part 81 is provided below and next to the waveform display part 6. The specific molding setting part 81 is used for the specific molding mode. The specific molding setting part 81 also forms a part of the operation waveform display means Fd. The specific molding setting part 81 includes a clamping force setting part 81s and an analog display part 81d. The clamping force setting part 81s has the function of setting the clamping force Pc [tonf] and is arranged below and next to the waveform display part 6. Providing the clamping force setting part 81s next to the waveform display part 6 allows setting with the clamping force setting part 81s while allowing check of a waveform (change) of the parting opening Lm displayed in the waveform display part 6. Thus, the clamping force Pc to largely influence change in the parting opening Lm can be set more accurately and easily.

The analog display part 81d has the function of displaying the parting opening Lm in an analog form obtained in real time. The analog display part 81d is arranged below and next to the waveform display part 6. The analog display part 81d illustrated in FIG. 5 is given a circular scale 81ds for analog display and is drawn to imitate a dial gauge as a fine measuring instrument. By providing the analog display part 81d, a condition of change in the parting opening Lm with time displayed in the waveform display part 6 and a numerical value (dimension) about the parting opening Lm obtained in real time and displayed in the analog display part 81d can be checked simultaneously. These displays generate a synergistic effect to advantageously make it possible to monitor the parting opening Lm optimally. The specific molding setting part 81 further includes a mold displacement monitor 82 having the function of showing the absolute value of the parting opening Lm in a numerical form displayed in the analog display part 81d, a rotation speed display part 83, a resin pressure display part 84, and a screw position display part 85.

The servo amplifier 52 includes a pressure compensator 56, a speed limiter 57, a rotation speed compensator 58, a torque compensator 59, a current detector 60, and the speed converter 61. The pressure compensator 56 receives the molding injection pressure Pi (limit pressure Ps) or the molding clamping force Pc from the controller body 51. The speed limiter 57 receives a speed limit value VL from the controller body 51. In response, the pressure compensator 56 outputs a speed command value compensated for in pressure and this speed command value is given to the speed limiter 57. This speed command value is limited with the limit pressure Ps. A speed command value output from the speed limiter 57 is limited with the speed limit value VL. The speed command value output from the speed limiter 57 is given to the rotation speed compensator 58. A torque command value output from the rotation speed compensator 58 is given to the torque compensator 59. Then, the torque compensator 59 outputs a motor driving current and this motor driving current is supplied to the servomotor 39, thereby driving the servomotor 39. An encoder pulse obtained from the rotary encoder 40 is converted to a speed detected value Vd by the speed converter 61 and the speed detected value Vd is given to the controller body 51. This speed detected value Vd is further given to the rotation speed compensator 58. This realizes feedback control of the rotation speed in a minor loop.

A method of molding by the injection molding machine M including the control method of this embodiment is described next specifically by referring to FIGS. 1 to 13.

An outline of the molding method is described first.

(A) First, the molding clamping force Pc and the molding injection pressure Pi to be used for production are obtained and set as a molding condition so as to satisfy the following conditions:

(x) A proper parting opening (natural clearance) Lm should be formed between the fixed mold 2c and the movable mold 2m during injection-filling; and (y) A molded article should be free from a molding failure such as a burr, shrinkage, or warpage.

In consideration of the occurrence of degassing and compression (natural compression) of the resin R, the natural clearance Lm is determined so as to satisfy the following:

(xa) A molding clearance Lmp should be within an allowable range from 0.03 to 0.30 [mm]; and (xb) A residual clearance Lmr should be within an allowable range from 0.01 to 0.10 [mm], wherein the molding clearance Lmp is a maximum parting opening and the residual clearance Lmr is a parting opening determined after a lapse of the cooling time Tc. Thus, the molding clearance Lmp becomes a maximum (max) of the parting opening Lm, whereas the residual clearance Lmr becomes a minimum (min) of the parting opening Lm.

(B) During production, on condition that the mold is clamped with the set molding clamping force Pc and the molding injection pressure Pi is set to the limit pressure Ps, the resin R is injected simply.

Thus, according to the aforementioned molding method, the natural clearance Lm is formed and natural compression occurs in the mold 2 during injection-filling. As a result, even if the behavior of the resin R injected for filling from the injection device Mi is unstable, the mold clamping device Mc still adjusts to the unstable behavior of the resin R, thereby obtaining a high-quality molded article with homogeneity.

Figure 6:
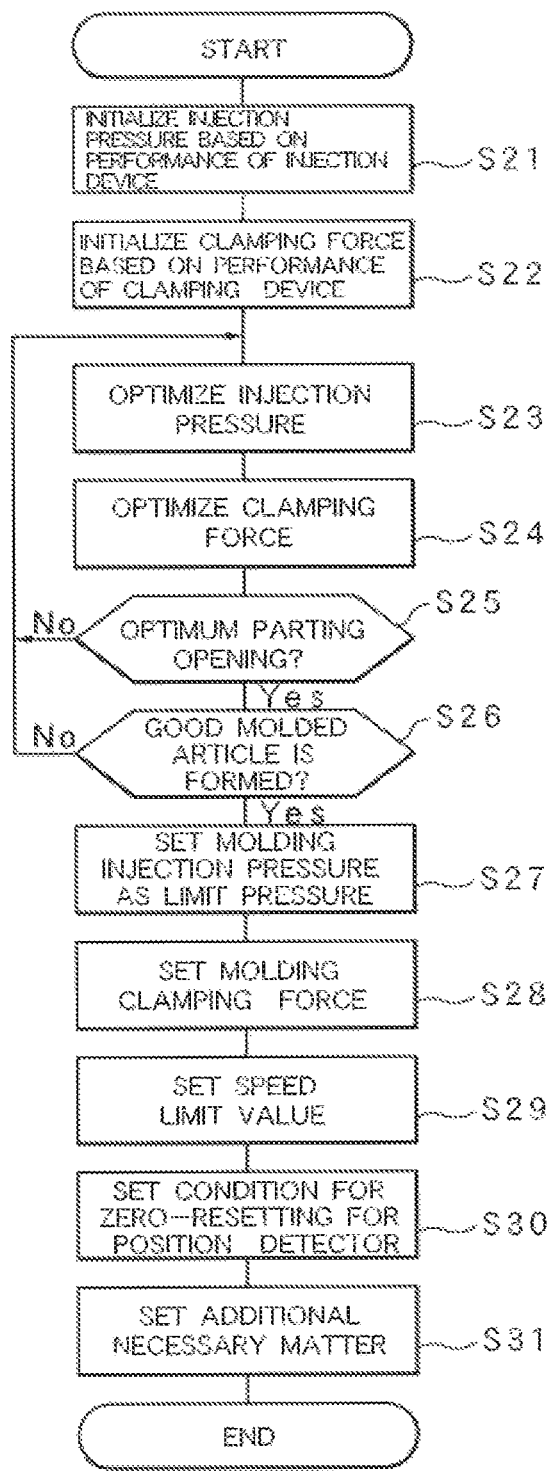
FIG. 6 is a flowchart explaining a procedure to be taken during setting of a molding condition in this injection molding machine.

A particular procedure is described next. First, the molding injection pressure Pi and the molding clamping force Pc to become a molding condition are obtained and set as the molding condition in advance. FIG. 6 is a flowchart explaining a procedure of obtaining and setting the molding injection pressure Pi and the molding clamping force Pc.

First, the specific molding mode is selected as a molding mode with the molding mode selector key Km. Then, an injection pressure to become an injection condition relating to the injection device Mi is initialized with the injection pressure setting part 72. The injection pressure to be initialized can be an injection pressure determined based on the performance (driving force) of the injection device Mi (step S21). In this case, the injection pressure can be determined using a hydraulic pressure Po detected by the pressure sensor 11 in the hydraulic circuit 35 connected to the injection cylinder 24. The injection pressure is not required to be determined accurately as an absolute value. Thus, the detected magnitude of the hydraulic pressure Po can be used as the injection pressure or can be converted by calculation to the injection pressure. Further, clamping force to become a clamping condition relating to the mold clamping device Mc is initialized with the clamping force setting part 81s. The clamping force to be initialized can be a clamping force determined based on the performance (driving force) of the mold clamping device Mc (step S22). In this case, the clamping force can be determined using the hydraulic pressure Po detected by the pressure sensor 11 in the hydraulic circuit 35 connected to the clamping cylinder 27. The clamping force is not required to be determined accurately as an absolute value. Thus, the detected magnitude of the hydraulic pressure Po can be used as the clamping force or can be converted by calculation to the clamping force. The hydraulic circuit 35 is switched by the valve circuit 37. During clamping, the hydraulic circuit 35 functions as a hydraulic circuit for the mold clamping device Mc. During injection, the hydraulic circuit 35 functions as a hydraulic circuit for the injection device Mi. Using the hydraulic pressure Po as the injection pressure and the clamping force facilitates setting relating to the molding clamping force Pc and the molding injection pressure Pi. Additionally, the molding clamping force Pc and the molding injection pressure Pi are not required to be determined correctly as absolute values. This achieves a highly-precise operation control with less error factors.

Next, the initialized injection pressure is optimized to obtain the molding injection pressure Pi to be used for production. Further, the initialized clamping force is optimized to obtain the molding clamping force Pc to be used for production (steps S23 and S24). An exemplary method of optimizing the clamping force and the injection pressure is described below by referring to FIG. 7.

Figure 7:
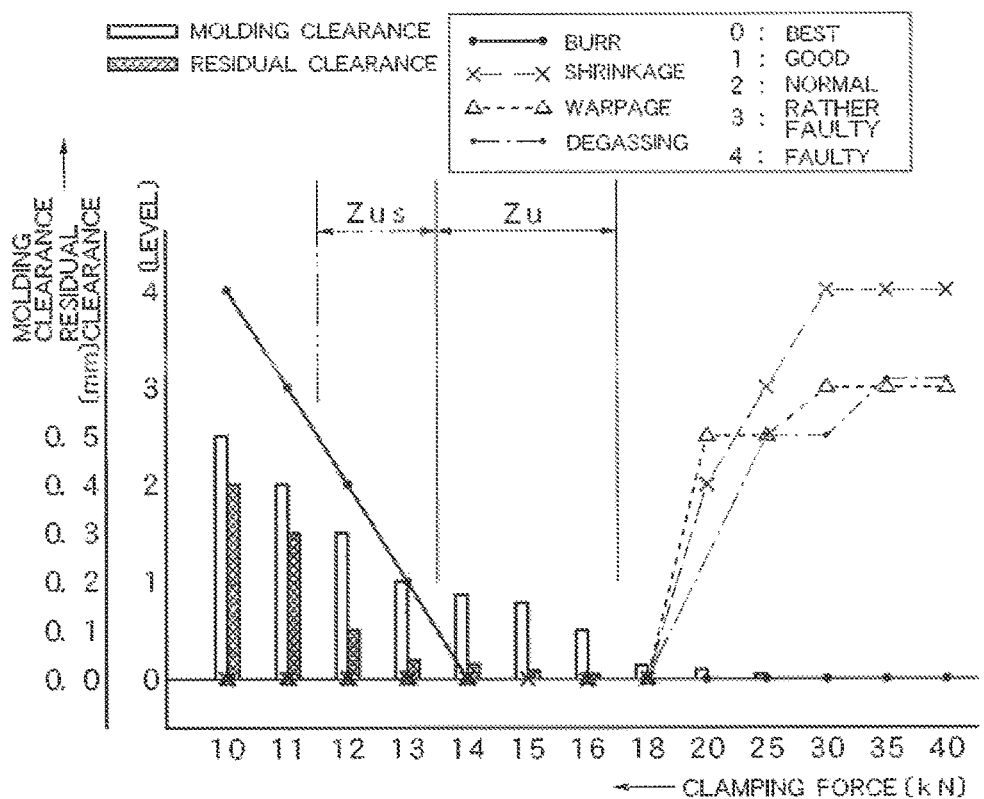
FIG. 7 is a data graph showing a result indicating whether a molded article is good or bad with respect to a clamping force used to explain a process of setting a molding condition to be employed in a method of molding by this injection molding machine.

A molded article is formed by way of trial with the initialized clamping force and injection pressure. Clamping action is taken in response to press of a molding start button. A molded article is formed by way of trial with the mold 2 under the initialized condition. In this example, the initialized clamping force is 40 [kN]. FIG. 7 shows a result of a molded article formed by way of trial with the initialized clamping force (40 [kN]) and the initialized injection pressure. This result shows that both the molding clearance Lmp and the residual clearance Lmr are 0. A clamping force is initialized to a relatively large magnitude. Thus, the result shows that a burr is at level 0 (best) indicating the absence of a burr, whereas shrinkage is at level 4 (faulty), warpage is at level 3 (rather faulty), and degassing is at level 3 (rather faulty).

As shown in FIG. 7, the magnitude of the clamping force and that of the injection pressure are reduced in stages and a molded article is formed at each stage. The parting opening Lm (Lmp, Lmr) between the fixed mold 2c and the movable mold 2m is measured and the condition of the molded article 100 (see FIG. 13(c)) indicating whether the molded article 100 is good or bad is observed (steps S25 and S26). FIG. 7 does not contain data about the injection pressure. The injection pressure can be optimized such that a minimum or a value near the minimum, settable on condition that the parting opening Lm is formed between the movable mold 2m and the fixed mold 2c during injection-filling and a good molded article can be formed, becomes the molding injection pressure Pi. More specifically, as shown in FIG. 7, the injection pressure is reduced appropriately while the clamping force is reduced. A magnitude next to a magnitude that disables normal filling of the mold 2 with the resin R can be selected. Selecting this minimum or a value near the minimum as the molding injection pressure Pi further makes it possible to set the molding clamping force Pc to a minimum or a value near the minimum. Thus, performance optimum for enhancing energy-saving properties can be achieved while protection and longer lifetime for example of a mechanism component can be intended. The obtained molding injection pressure Pi is set as the limit pressure Ps of an injection pressure during the production (step S27).

The result of FIG. 7 shows that both the molding clearance Lmp and the residual clearance Lmr fall within their allowable ranges if a clamping force is at 14, 15, or 16 [kN] surrounded by a virtual line frame Zu. Specifically, the molding clearance Lmp falls within the allowable range from 0.03 to 0.30 [mm] and specifically, an allowable range from 0.03 to 0.20 [mm]. The residual clearance Lmr falls within the allowable range from 0.01 to 0.10 [mm] and specifically, an allowable range from 0.01 to 0.04 [mm]. Additionally, a burr, shrinkage, and warpage should be all at level 0 (best) indicating the absence of a burr, shrinkage, and warpage, and degassing is at level 0 (best), thereby satisfying the condition of obtaining a good molded article. Thus, the molding clamping force Pc can be selected from the three clamping forces 14, 15 and 16 [kN]. The selected clamping force is set as the molding clamping force Pc to be applied for clamping the mold 2 during production (step S28).

In the case of FIG. 7, with the molding clearance Lmp falling within the allowable range from 0.03 to 0.20 [mm] and the residual clearance Lmr falling within the allowable range from 0.01 to 0.04 [mm], a best molded article free from the occurrence of a burr can be obtained. Meanwhile, in some cases, a burr can be removed after ejection of a molded article and a molded article with a burr of some extent can still be used as a good article. Thus, the occurrence of not a serious burr at level 1 (good) or 2 (normal) in an article does not immediately mean that this article is faulty. In consideration of the data shown in FIG. 7, a clamping force 12 or 13 [kN] surrounded by a virtual line frame Zus is also selectable according to the type of a molded article, for example. Specifically, a good molded article can be obtained with the molding clearance Lmp falling within the allowable range from 0.03 to 0.30 [mm] and the residual clearance Lmr falling within the allowable range from 0.01 to 0.10 [mm].

The data in FIG. 7 is to explain setting of the molding clamping force Pc and the molding injection pressure Pi. Thus, during actual setting, the target molding clamping force Pc and the target molding injection pressure Pi can be obtained by changing a clamping force about several times between 40, 30, 20 and 10, for example. In this case, an operator can set the magnitude of a clamping force and that of an injection pressure at will. Alternatively, the magnitude of a clamping force and that of an injection pressure can be obtained automatically or semi-automatically in combination of an automatic tuning function or the like provided in the injection molding machine M. Using the automatic tuning function makes it possible to easily obtain a clamping force next to a clamping force with which a burr occurs.

The speed limit value VL of the injection speed Vd of the injection device Mi is set (step S29). The speed limit value VL is not always required to be set. However, in the event of excessive increase in the injection speed Vd, setting the speed limit value VL can mechanically protect the mold 2, an injection screw or the like. Thus, the speed limit value VL is set to a magnitude that allows mechanical protection of the mold 2, the injection screw or the like.

A condition for zero-resetting is set that is to be applied to the position detector 3s that detects the parting opening Lm (step S30). According to the control method (control device 1) of this embodiment, during production described later, reset control is executed to reset the position detector 3s to zero if reset timing tr set in advance has come at least on condition that given preparation for injection is completed after clamping by the mold clamping device Mc is finished. Regarding the zero-resetting condition, timing of executing the reset control is set as the reset timing tr.

The reset control for zero-resetting is generally executed in a closed position while the mold 2 is clamped, specifically immediately after the mold 2 is clamped. This generates some injection standby time to when injection is started. The set molding clamping force Pc is maintained in this injection standby time, so that the parting opening Lm is not influenced under normal circumstances. However, during the injection standby, not a few disturbance factors exist and they become non-negligible issues in terms of obtaining the parting opening Lm accurately. These disturbance factors eventually become error factors of the parting opening Lm. In the control method of this embodiment, the reset timing tr of executing the reset control is set at least on condition that the given preparation for injection is completed after clamping by the mold clamping device Mc is finished. In this case, completion of the given preparation for injection can include at least one or both of the following conditions: nozzle-touch action should be finished; and a mold temperature should reach a stable condition.

Figure 9:
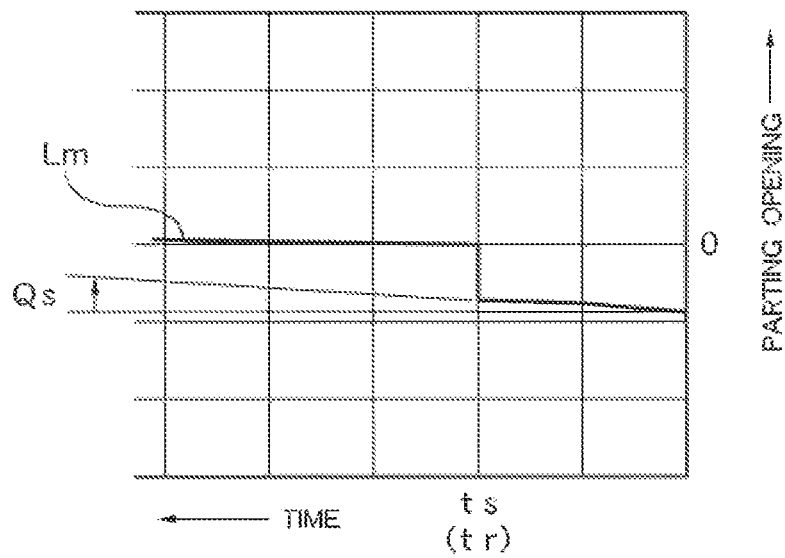
FIG. 9 explains an error factor relating to this control method.
Figure 10:
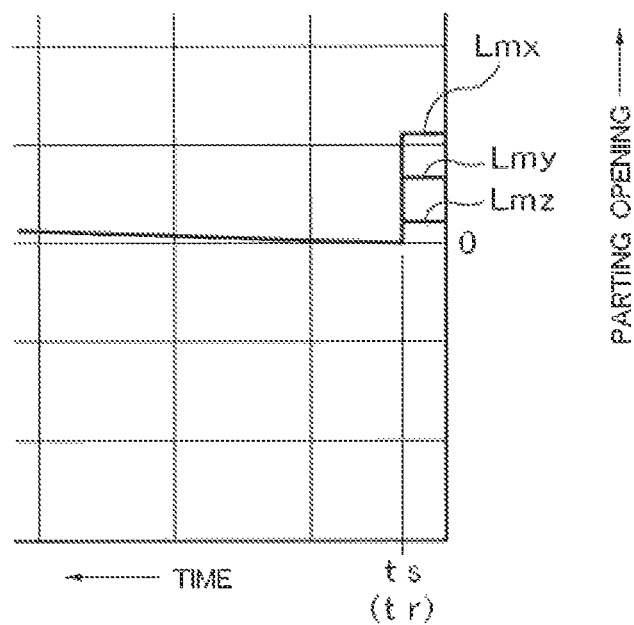
FIG. 10 explains a different error factor relating to this control method.

FIGS. 9 and 10 show experimental results showing influences by actual disturbance factors occurring during injection standby. FIG. 9 shows influence of changing the mold temperature on the parting opening Lm, specifically fluctuation in the magnitude of the parting opening Lm responsive to output of detection from the position detector 3s. As clearly seen from FIG. 9, the magnitude of the parting opening Lm during the injection standby changes with a gradient Qs. A sign ts shows injection start time. Thus, as shown in FIG. 9, by executing the reset control of resetting the position detector 3s to zero at the injection start time ts, injection can be started with the parting opening Lm at 0 while an error factor resulting from the mold temperature is eliminated.

FIG. 10 shows influence of nozzle-touch action on the parting opening Lm during the injection standby. In FIG. 10, Lmx, Lmy, and Lmz show the magnitudes of the parting opening Lm determined by nozzle-touch action during three different shots. As clearly seen from FIG. 10, the parting opening Lm is influenced by the nozzle-touch action to actually change the magnitude of the parting opening Lm between every nozzle-touch action. Thus, like in the case of FIG. 9, even with the parting openings Lmx, Lmy, and Lmz differing between shots, executing the reset control of resetting the position detector 3s to zero at the injection start time ts still makes it possible to start injection with the parting opening Lm at 0 while an error factor resulting from the nozzle-touch action is eliminated, as shown in FIG. 10.

Figure 11:
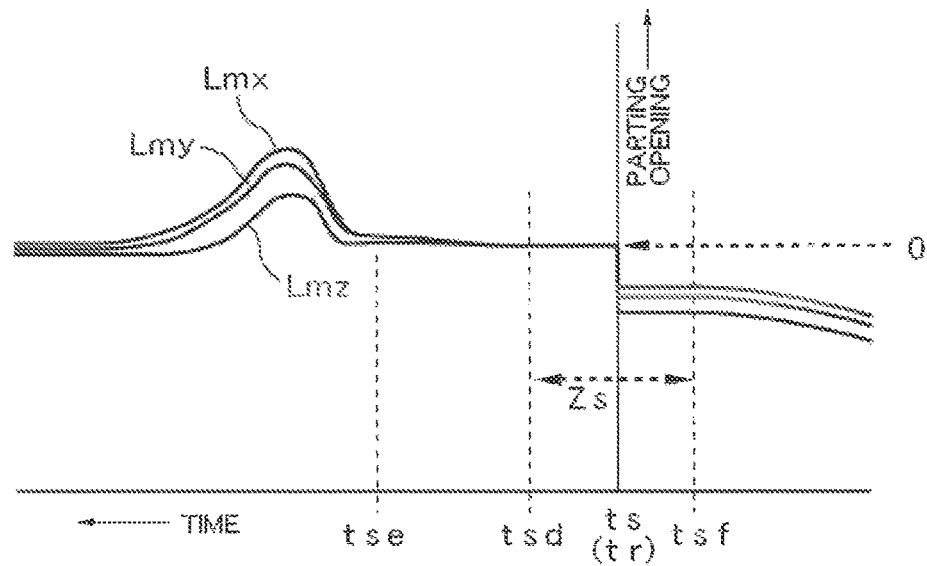
FIG. 11 explains principles of setting in this control method.

In the foregoing example, the reset timing tr is made to coincide with the injection start time ts. The reset timing tr is basically made to coincide with the injection start time ts in terms of rationality. Meanwhile, as long as the parting opening Lm is free from an unnecessary error due to a disturbance factor, the reset timing tr is not always required to coincide with the injection start time ts. As shown in FIG. 11, the reset timing tr can be set in a range covering given periods Zs before and after the injection start time ts.

Referring to FIG. 11, a sign tsf shows a time point when nozzle-touch action is finished and the mold temperature is stable at a fixed condition. Thus, executing the reset control in a period from the time point tsf to the injection start time ts also achieves effect comparable to that achieved by executing the reset control at the injection start time ts. After the injection start time ts, the parting opening Lm (Lmx, Lmy, Lmz) is maintained substantially unchanged before a time point tse when filling the mold 2 with the resin R is nearly completed. In the case illustrated in FIG. 11, the parting opening Lm (Lmx, Lmy, Lmz) is maintained substantially unchanged to a time point tsd. Thus, executing the reset control in a period from the injection start time ts to the time point tsd also achieves effect comparable to that achieved by executing the reset control at the injection start time ts. In this way, the reset timing tr can be set in the range covering a period from the time point tsf to the time point tsd, specifically the range covering the given periods Zs before and after the injection start time ts.

The reset timing tr is set as one of conditions for molding relating to one molding cycle. The reset control is executed for each shot. Thus, errors due to various disturbance factors can be eliminated most effectively, so that the dimensions of the parting openings Lm can always be collected accurately and stably for corresponding shots.

An additional necessary matter is set in the presence of such a matter (step S31). The injection molding machine M illustrated in the drawings has a correction function by which the molding clamping force Pc is corrected with the level of an oil temperature To detected by the temperature sensor 12 in the hydraulic circuit 35. This correction function is to eliminate influence of the oil temperature To on the molding clamping force Pc to be caused by a temperature drift, for example. This correction function can always stabilize the molding clamping force Pc, contributing to more highly-precise and more stable operation control and a high quality and homogeneity of a molded article. Accordingly, a correction factor to be used for correction by the correction function can be the additional necessary matter to be set, for example.

A specific procedure to be taken during production using the control method of this embodiment is described next according to the flowcharts of FIGS. 1 and 2 while referring to each drawing.

Figure 1:
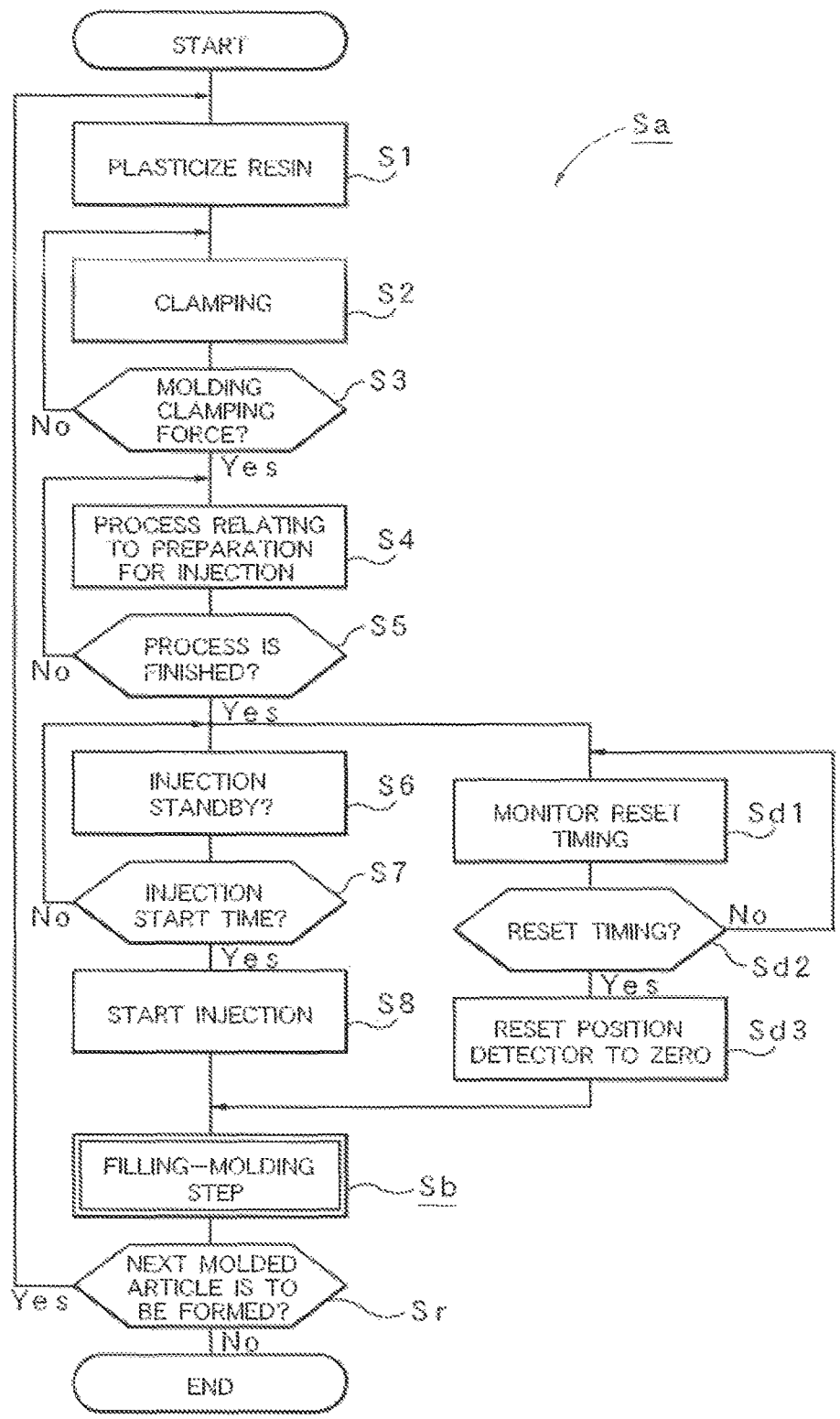
FIG. 1 is a flowchart explaining a procedure of a step before filling to be performed during production by adopting a control method of a preferred embodiment of this invention.
Figure 2:
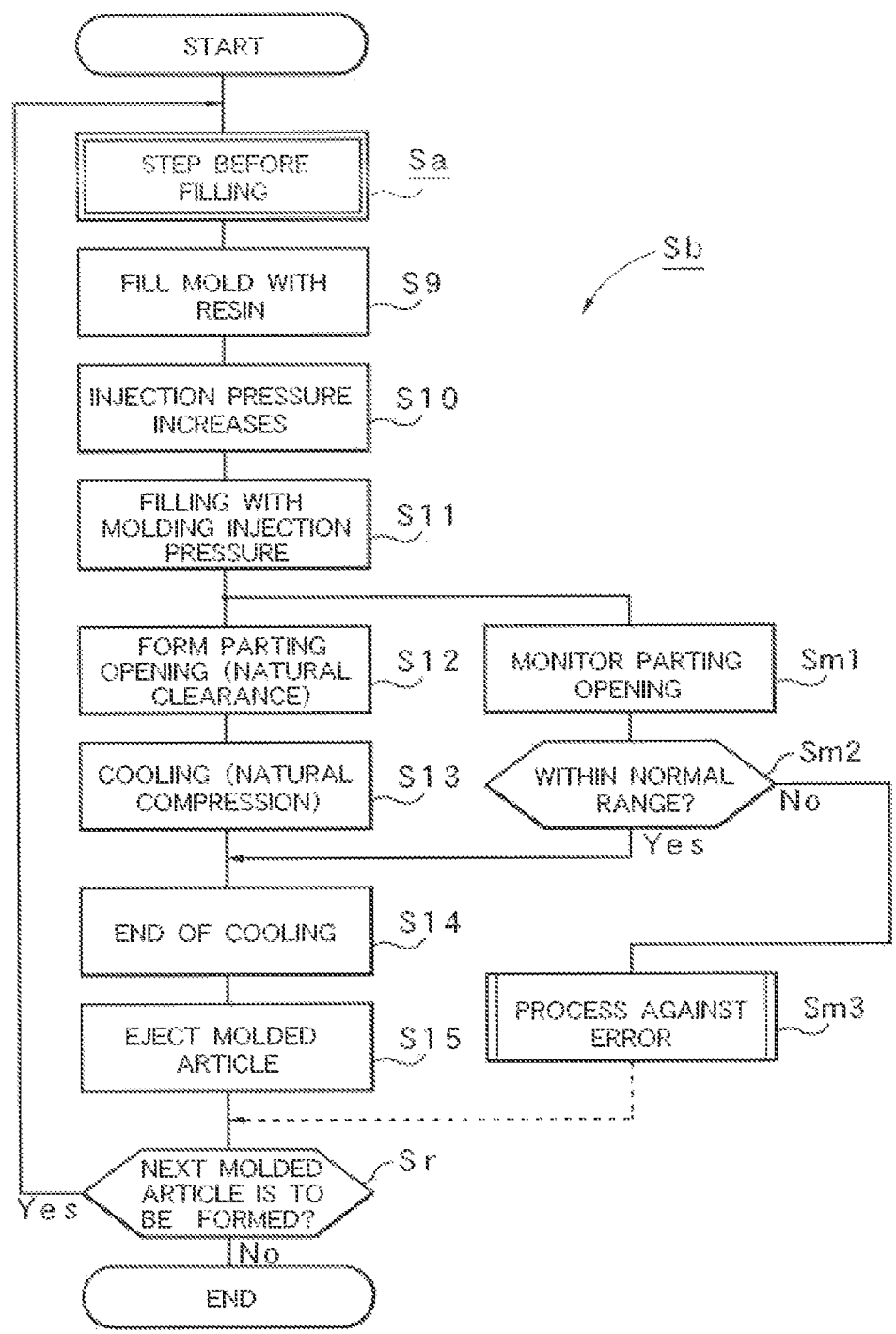
FIG. 2 is a flowchart explaining a procedure of a filling-molding step to be performed during production by adopting this control method.

FIGS. 1 and 2 show procedures to be taken during production by using the molding injection pressure Pi and the molding clamping force Pc. FIG. 1 shows a step Sa before filling to be performed in a period from preparation for injection to start of injection. FIG. 2 shows a filling-molding step Sb to be performed in a period from start of filling to when a molded article is ejected.

First, in response to switching by the valve circuit 37 and control of the servomotor 39, the metering motor 25 of the injection device Mi is driven to plasticize the resin R (step Sp. Like a general molding method, this molding method does not require a metering step of metering the resin R accurately. Specifically, in the molding method of this embodiment, what is required in an injection step is only to inject the resin R until the cavity is filled with the resin R completely. This only requires metering of the resin R to an amount slightly larger than is necessary in the metering step. Thus, although metering action in this metering step is conducted like in a general metering step, it is not necessary to carry out metering control intended to obtain an accurate metered value. Then, in response to switching by the valve circuit 37 and control of the servomotor 39, the clamping cylinder 27 of the mold clamping device Mc is driven to clamp the mold 2 such that the molding clamping force Pc is applied as a clamping force (steps S2 and S3). FIG. 13(a) shows the condition of the mold 2 determined at this time.

A process relating to preparation for injection is performed after the clamping is finished (steps S4 and S5). This process includes control of nozzle-touch by making nozzle-touch action and control of the mold temperature. In the nozzle-touch action, the injection device moving cylinder 26 is driven to move the injection device Mi forward, thereby causing nozzle-touch with the mold 2. The mold temperature is controlled such that the mold temperature changed by opening the mold becomes a proper set temperature.

After these processes relating to preparation for injection are finished, the injection device Mi is placed in an injection standby condition (step S6). Meanwhile, the molding machine controller 4 checks to see whether the determined reset timing tr has come (step Sd1). As shown in this example, if the reset timing tr is made to coincide with the injection start time ts, injection is started at the injection start time ts (step S7 and S8) and the reset control to reset the position detector 3s to zero is executed at the injection start time ts (steps Sd2 and Sd3).

Figure 8:
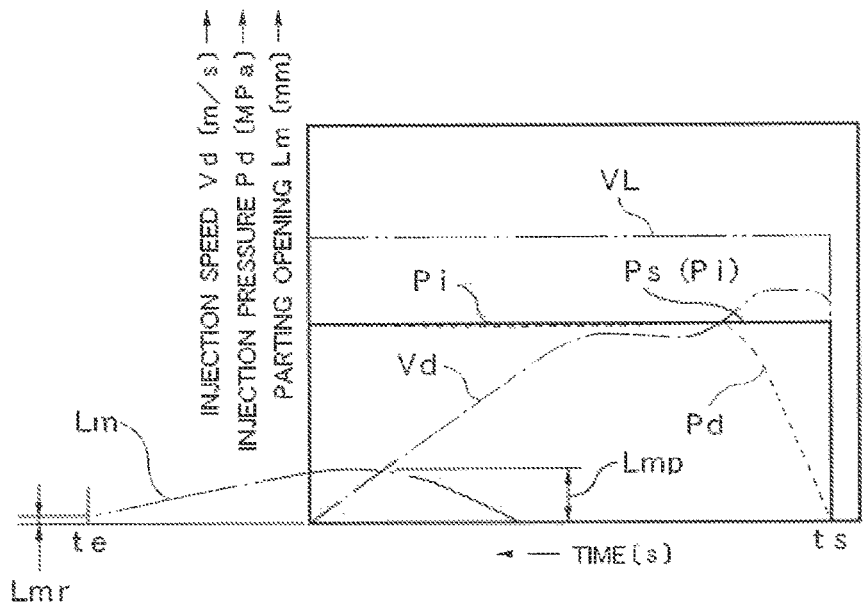
FIG. 8 shows characteristics of change in an injection pressure, an injection speed, and a mold clearance with time during production by this injection molding machine.

At the injection start time ts, in response to switching by the valve circuit 37 and control of the servomotor 39, the injection cylinder 24 of the injection device Mi is driven to start injection of the resin R at the injection start time ts shown in FIG. 8. At this time, the screw 22 is required only to go forward according to rated operation and speed control and pressure control of the screw 22 are not required. The reset timing tr has come at the injection start time ts. Thus, the molding machine controller 4 executes the reset control of resetting the position detector 3s to zero at the injection start time ts. As a result, as shown in FIG. 5, all the parting openings Lm (Lma, Lmb, Lmc, Lmd) for each shot are reset to zero, so that the parting opening Lm (including Lma) becomes zero at the time point of the reset timing tr.

Then, the step Sa before filling is finished to proceed to the filling-molding step Sb. As a result of the aforementioned start of injection, the plasticized and molten resin R in the heating tube 21 fills in the cavity of the mold 2 (step S9). As shown in FIG. 8, filling with the resin R increases the injection pressure Pd. When the injection pressure Pd comes close to the limit pressure Ps and then reaches the limit pressure Ps, control is executed to maintain the injection pressure Pd at the limit pressure Ps, specifically control is executed to prevent overshoot. As a result, the injection pressure Pd is maintained at the limit pressure Ps (molding injection pressure Pi) (steps S10 and S11). Thus, the injection action is controlled under substantially one pressure. In FIG. 8, a sign Vd shows an injection speed.

Filling the cavity of the mold 2 completely with the resin R makes the resin R press the mold 2, thereby forming the mold clearance Lm between the fixed mold 2c and the movable mold 2m. The mold clearance Lm becomes the molding clearance Lmp at its maximum (step S12). The molding clearance Lmp is made to fall within the allowable range from 0.03 to 0.30 [mm], desirably the allowable range from 0.03 to 0.20 [mm] under the molding clamping force Pc and the molding injection pressure Pi set in advance. This achieves favorable degassing and formation of a good molded article free from a failure. FIG. 13(b) shows the condition of the mold 2 determined at this time.

Data about change in the parting opening Lm is detected at least in a period from the injection start time ts to the end te of cooling of the mold 2. More specifically, the position detector 3s to detect the positions of the movable mold 2m and the fixed mold 2c relative to each other is used to detect the dimension of the parting opening Lm relative to time (change data) at given sampling time intervals. The change data about the parting opening Lm thereby detected is given to the controller body 51.

The injection and metering screen 5v shown in FIG. 5 is displayed on the display 5. In response to progress of the molding step, the change data about the parting opening Lm is displayed anytime as a waveform in the waveform display part 6 having a temporal axis as the horizontal axis. In this case, at least a period from the injection start time ts to the end te of cooling of the mold 2 is shown reliably on the temporal axis. For this display, the operation waveform display means Fd of the molding machine controller 4 displays the change data about the parting opening Lm detected by the position detector 3s at least in a period from when injection into the mold 2 is started to when cooling of the mold 2 ends. This allows an operator to monitor change in the waveform of the parting opening Lm of the mold 2 in the waveform display part 6 that corresponds to an operation waveform relating to the mold clamping device Mc. FIG. 5 shows the molding clearances (parting openings) Lma, Lmb, Lmc, and Lmd formed in four different shots.

As described above, the molding machine controller 4 includes the operation waveform display means Fd that displays change data detected by the parting opening detector 3 in a period from start of injection to end of cooling of the mold 2 in the waveform display part 6 on the screen 5v on the display 5 provided to the molding machine controller 4. This allows change in the parting opening Lm of the mold 2 as an operation waveform relating to the mold clamping device Mc to be monitored easily and effectively by visual recognition. Additionally, as a result of effect achieved by the aforementioned zero-resetting, the waveforms of all the parting openings Lm with the same zero-point can be displayed (and superimposed) accurately.

As a result, the set molding clamping force Pc is maintained during injection standby from when clamping is finished to when injection is started. Further, even if there is a disturbance factor resulting from fluctuation of the mold temperature between every shot, action taken in a different concurrent step or the like, unnecessary influence on the magnitude of the parting opening Lm can be eliminated. Thus, accurate data about the parting opening Lm can be collected stably. Thus, all the parting openings Lm with the same zero-point can be monitored accurately and a molded article can be determined to be good or bad correctly, thereby contributing to increase in a yield.

The reset control of making zero-resetting is executed on condition that preparation for injection is completed. Completion of the preparation for injection includes one or both of the following conditions: nozzle-touch action should be finished; and the mold temperature should reach a stable condition. This can eliminate the two factors to become the most serious disturbance factors to influence the dimension of the parting opening Lm. Thus, effects can be ensured effectively relating to the aforementioned accurate monitoring of all the parting openings Lm and a correct determination as to whether a molded article is good or bad.

Figure 12:
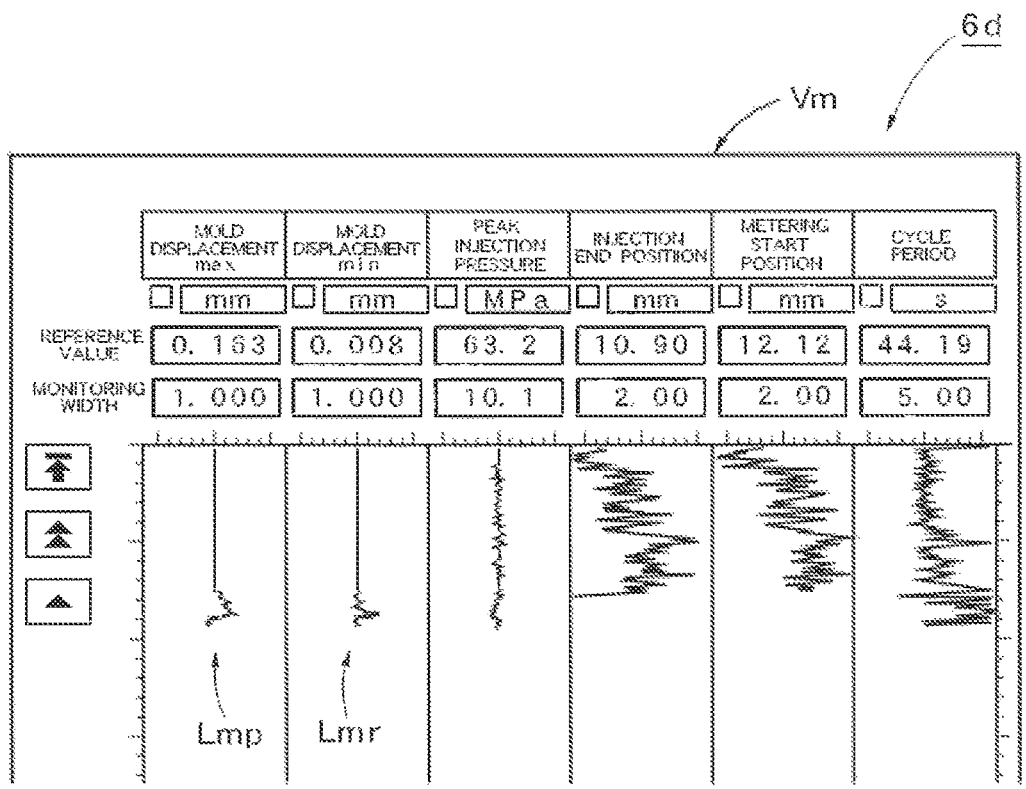
FIG. 12 shows the structure of a monitor screen including trend graphs on a display provided to this injection molding machine.

As shown in FIG. 12, the parting opening (mold displacement) Lm, specifically, the maximum Lmp and the minimum Lmr are shown in trend graphs. Further, a monitoring width to make the parting opening Lm fall within a normal range is set, thereby determining whether the parting opening Lm is good or bad (steps Sm1 and Sm2). Thus, it can always be determined correctly whether the parting opening Lm is good or bad. In the process of determining whether the parting opening Lm is good or bad, if the parting opening Lm goes out of the normal range (monitoring width), a required process can be performed against this error (step Sm3).

As shown in FIG. 5, by the provision of the superimposing function, data about change in the injection pressure Pd with time, specifically the injection pressure Pd detected by the pressure sensor 11 is superimposed on data about change in the parting opening Lm in the waveform display part 6. Further, data about change in the injection speed Vd with time, specifically the injection speed Vd obtained from the speed converter 61 is superimposed on the data about change in the parting opening Lm in the waveform display part 6. Therefore, this superimposing function makes it possible to understand the change in the parting opening Lm with time in comparison with the change in the injection pressure Pd and the change in the injection speed Vd with time, so that the change data about the parting opening Lm can be monitored more accurately. Further, the parting opening Lm obtained in real time is displayed in an analog form in the analog display part 81d arranged below and next to the waveform display part 6. Thus, a condition of change in the parting opening Lm with time displayed in the waveform display part 6 and a numerical value (dimension) about the parting opening Lm obtained in real time and displayed in the analog display part 81d can be checked simultaneously. These generate a synergistic effect to make it possible to monitor the parting opening Lm optimally.

The resin R in the cavity of the mold 2 is hardened further with a lapse of time and this hardening causes compression (natural compression) of the resin R (step S13). When the set cooling time Tc has elapsed, the clamping cylinder 27 is driven in response to switching by the valve circuit 37 and control of the servomotor 39 to move the movable mold 2m backward, thereby opening the mold. Then, in response to switching by the valve circuit 37 and control of the servomotor 39, the ejector cylinder 31 is driven to eject the molded article 100 attached to the movable mold 2m (steps S14 and S15). As a result, the molded article 100 is taken out to complete one molding cycle. The cooling time Tc can be set in advance as time to elapse after the injection start timing ts. As shown in FIG. 8, at the time point to when the cooling time Tc has elapsed, the natural compression of the resin R occurs. Thus, at this time, the residual clearance Lmr between the fixed mold 2c and the movable mold 2m is made to fall within the allowable range from 0.01 to 0.10 [mm], desirably the allowable range from 0.01 to 0.04 [mm] under the molding clamping force Pc and the molding injection pressure Pi set in advance. This reliably causes the natural compression of the resin R in the cavity of the mold 2 and ensures the high quality and homogeneity of the molded article 100. FIG. 13(c) shows the condition of the mold 2 determined at this time.

If the next molding is continuously conducted thereafter, the resin R is plasticized to prepare for injection in the same way. Then, the same subsequent processes including clamping, injection, and cooling may follow (including steps Sr, S1 and S2) in the same way. In the aforementioned molding method according to the specific molding system (specific molding mode), the molding injection pressure Pi and the molding clamping force Pc are obtained and set in advance with which the given clearance Lm is formed between the movable mold 2m and the fixed mold 2c during injection-filling and which allows formation of a good molded article. During production, the mold clamping device Mc is clamped with the molding clamping force Pc, the molding injection pressure Pi is set as the limit pressure Ps, and the injection device Mi is driven to injection-fill the mold 2 with the resin R. Thus, the set molding injection pressure Pi can always be applied to the resin R filling the mold 2. As a result, the given mold clearance Lm can be formed by a relationship between the fixed molding clamping force Pc and the fixed molding injection pressure Pi relative to each other and the molding clamping force Pc allows natural compression of the resin R to continue after injection-filling with the resin R is finished. The high quality and homogeneity of the molded article 100 can be ensured accordingly. This works optimally for molding of the resin R of a low viscosity sensitive to a temperature or a pressure, for example. Further, a direct-pressure hydraulic mold clamping device to displace the movable mold 2m with the driving ram 27r of the clamping cylinder 27 is used as the mold clamping device Mc. This particularly serves for natural compression of the resin R in the mold 2 to be caused by directly using the behavior of the hydraulic pressure of the mold clamping device Mc itself. This achieves favorable natural compression reliably and contributes to facilitation of control.

This molding method only involves setting of the molding injection pressure Pi and the molding clamping force Pc. This molding method does not involve setting of various molding conditions to influence each other including injection conditions required to be accurate such as an injection speed, a speed change position, an injection pressure and a pressure keeping force, and metering conditions required to be metered accurately such as a metered value. This contributes to simplification of a molding condition, facilitation of setting, and ease of quality management. This further facilitates operation control during production. Additionally, this method contributes to a shortened period of a molding cycle by eliminating a series of controls such as control of an injection speed at multiple stages or control of pressure keeping, while enhancing mass productivity and economic performance.

This invention is not limited to the preferred embodiment described in detail above. This invention can be subjected to any change, addition, or deletion in terms of detailed structures, shapes, quantities, methods and the like within a range that does not deviate from the spirit of the invention.

As an example, the reflection range sensor 3ss is shown as an example of the position detector 3s. Alternatively, various non-contact sensors such as a proximity sensor capable of detecting a clearance and others precisely are applicable. It is desirable that the given residual clearance Lmr be formed between the movable mold 2m and the fixed mold 2c after the cooling time Tc has elapsed. However, this is not intended to eliminate the case where the residual clearance Lmr is not formed. Further, a direct-pressure hydraulic mold clamping device is shown as an example of a device in the injection molding machine M. Alternatively, an electrically-driven toggle mold clamping device may be used. In this case, clamping may be done while a toggle link mechanism is placed in an unlocked up condition. Even if the mold clamping device Mc employs a toggle system that cannot achieve natural compression if being used in an original way, this still achieves natural compression to realize molding according to the specific molding system (specific molding mode) in a way comparable to that realized by a direct-pressure hydraulic mold clamping device. Further, a range from 0.03 to 0.30 [mm] is shown as an example of the allowable range for the molding clearance Lmp and a range from 0.01 to 0.10 [mm] is shown as an example of the allowable range for the residual clearance Lmr. However, the clearances are not intended to be limited to these ranges but they can be changed according to the type of a new resin R, for example. It is desirable that the molding injection pressure Pi be set to its minimum that allows formation of a good molded article or a value near the minimum. However, this is not intended to eliminate the case where the molding injection pressure Pi is different from this minimum or a value near the minimum. Further, completion of preparation for injection can include one or both of the following conditions: nozzle-touch action should be finished; and the mold temperature should reach a stable condition. However, this is not intended to eliminate different preparation for injection. Still further, it is desirable that the reset control be executed for each shot. However, this is not intended to limit the reset control to one to be executed for each shot. The reset control may be executed for every other shot.

INDUSTRIAL APPLICABILITY

The control method and the control device of this invention can be adopted in any injection molding machine that performs molding by filling the mold 2 clamped by the mold clamping device Mc with the resin R injected by the injection device Mi.

REFERENCE SIGNS LIST

1: Control device, 2: Mold, 2m: Movable mold, 2c: Fixed mold, 3: Parting opening detector, 3s: Position detector, 4: Molding machine controller, 5: Display, 5v: Screen on display, 6: Waveform display part, M: Injection molding machine, Mc: Mold clamping device, Mi: Injection device, Lm: Parting opening, Pi: Molding injection pressure, Pc: Molding clamping force, Ps: Limit pressure, R: Resin, Zs: Prior and posterior given periods, ts: Reset timing, Fd: Operation waveform display means

CITATION LIST

Patent Literature 1

JP-No. I-125(2013)-22842

The invention claimed is:

1. A control method for an injection molding machine, the control method being adopted for molding according to a specific molding system where a molding injection pressure and a molding clamping force are obtained and set in advance, and during production, a mold clamping device is clamped with the molding clamping force and an injection device to apply the molding injection pressure as a limit pressure is driven to injection-fill a mold with resin, the molding injection pressure being an injection pressure with which a parting opening, to become a given clearance, is formed between a movable mold and a fixed mold of the mold during injection-filling and which allows formation of a good molded article, the molding clamping force being a clamping force that allows formation of a good molded article, wherein
 a parting opening detector is provided that detects the parting opening, and
 a reset control is executed to reset the parting opening detector to zero during production, if reset timing set in advance has come at least on the condition that the given preparation for injection is completed, by satisfying either completion of nozzle-touch action or arrival of a mold temperature at a stable condition, after clamping by the mold clamping device is finished, the reset timing being set in a range covering a given period before injection start time and the given period after the injection start time.

2. The control method for an injection molding machine according to claim 1, wherein the mold is cooled in a period from when injection-filling of the mold with the resin by driving the injection device is finished to when given cooling time has elapsed.

3. The control method for an injection molding machine according to claim 1, wherein data about change in the parting opening is displayed in a waveform display part on a screen on a display provided to a molding machine controller, the data being detected by the parting opening detector in a period from start of injection to end of cooling of the mold.

4. The control method for an injection molding machine according to claim 1, wherein the reset timing is set as a molding condition in one molding cycle and the reset control is executed for each shot.

5. A control device for an injection molding machine, the control device being provided in an injection molding machine that performs molding according to a specific molding system where a molding injection pressure and a molding clamping force are obtained and set, a mold clamping device is clamped with the molding clamping force, and an injection device to apply the molding injection pressure as a limit pressure is driven to injection-fill a mold with resin, the molding injection pressure being an injection pressure with which a parting opening to become a given clearance is formed between a movable mold and a fixed mold of the mold during injection-filling and which allows formation of a good molded article, the molding clamping force being a clamping force that allows formation of a good molded article, the control device comprising:
 a parting opening detector that detects the parting opening; and
 a molding machine controller that executes reset control to reset the parting opening detector to zero if reset timing set in advance has come, at least on the condition that the given preparation for injection is completed, by satisfying either completion of nozzle-touch action or arrival of a mold temperature at a stable condition, after clamping by the mold clamping device is finished, the reset timing being set in a range covering a given period before injection start time and the given period after the injection start time.

6. The control device for an injection molding machine according to claim 5, wherein a position detector is used as the parting opening detector, the position detector being provided to the mold to detect the position of the movable mold and the position of the fixed mold relative to each other.

7. The control device for an injection molding machine according to claim 6, wherein the position detector is formed of a combination of a reflection plate and a reflection range sensor that measures a distance by projecting light or a radio wave to the reflection plate.

8. The control device for an injection molding machine according to claim 5, wherein the molding machine controller includes an operation waveform display means that displays data about change in the parting opening in a waveform display part on a screen on a display provided to the molding machine controller, the data being detected by the parting opening detector in a period from start of injection to end of cooling of the mold.

* * * * *